Dec. 26, 1944.  C. J. HOLSLAG  2,365,958
CONTINUOUS ARC WELDING SYSTEM
Filed July 10, 1943  2 Sheets-Sheet 2
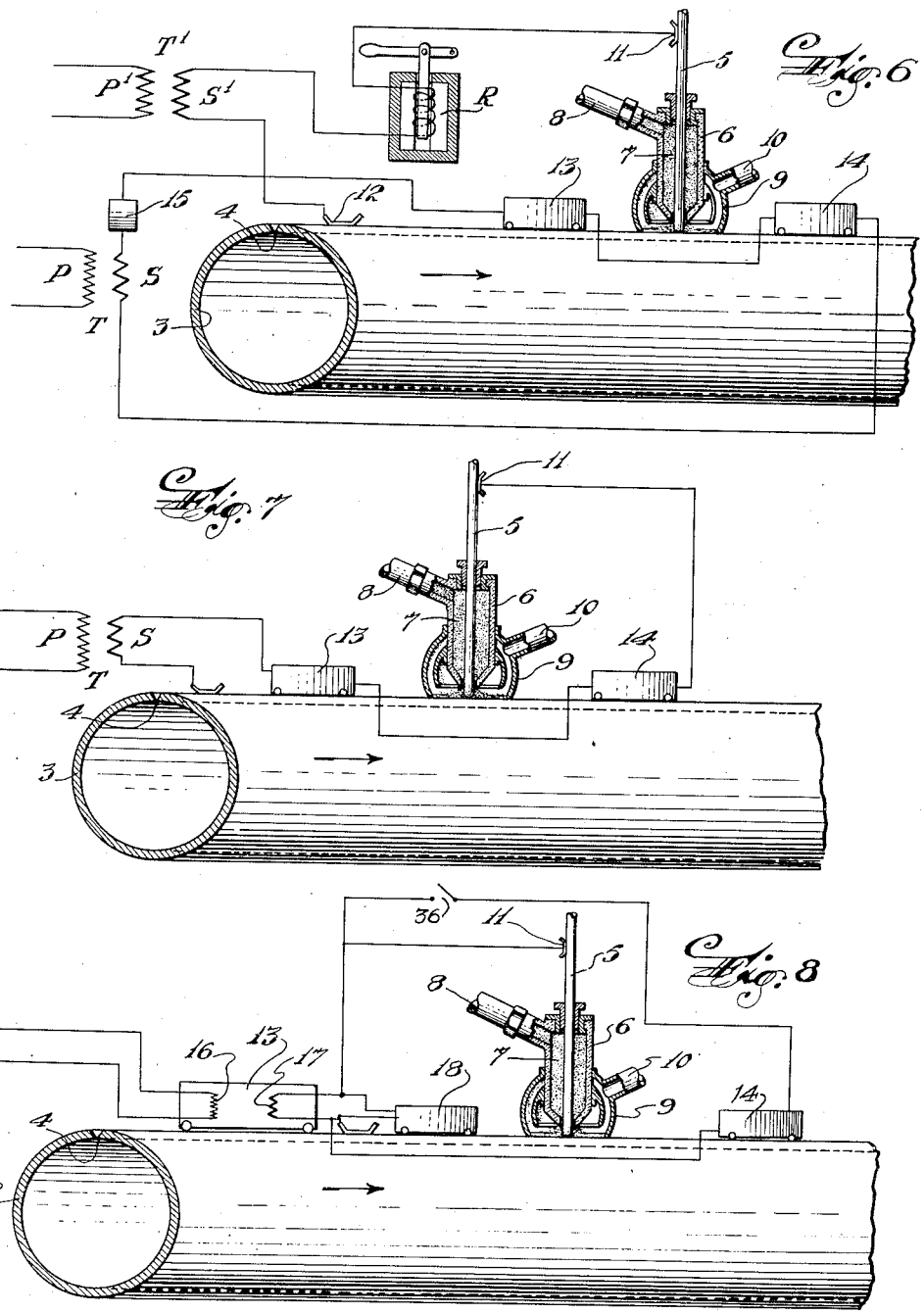
Inventor
Claude J. Holslag
By
A. D. T. Libby
Attorney Patented Dec. 26, 1944

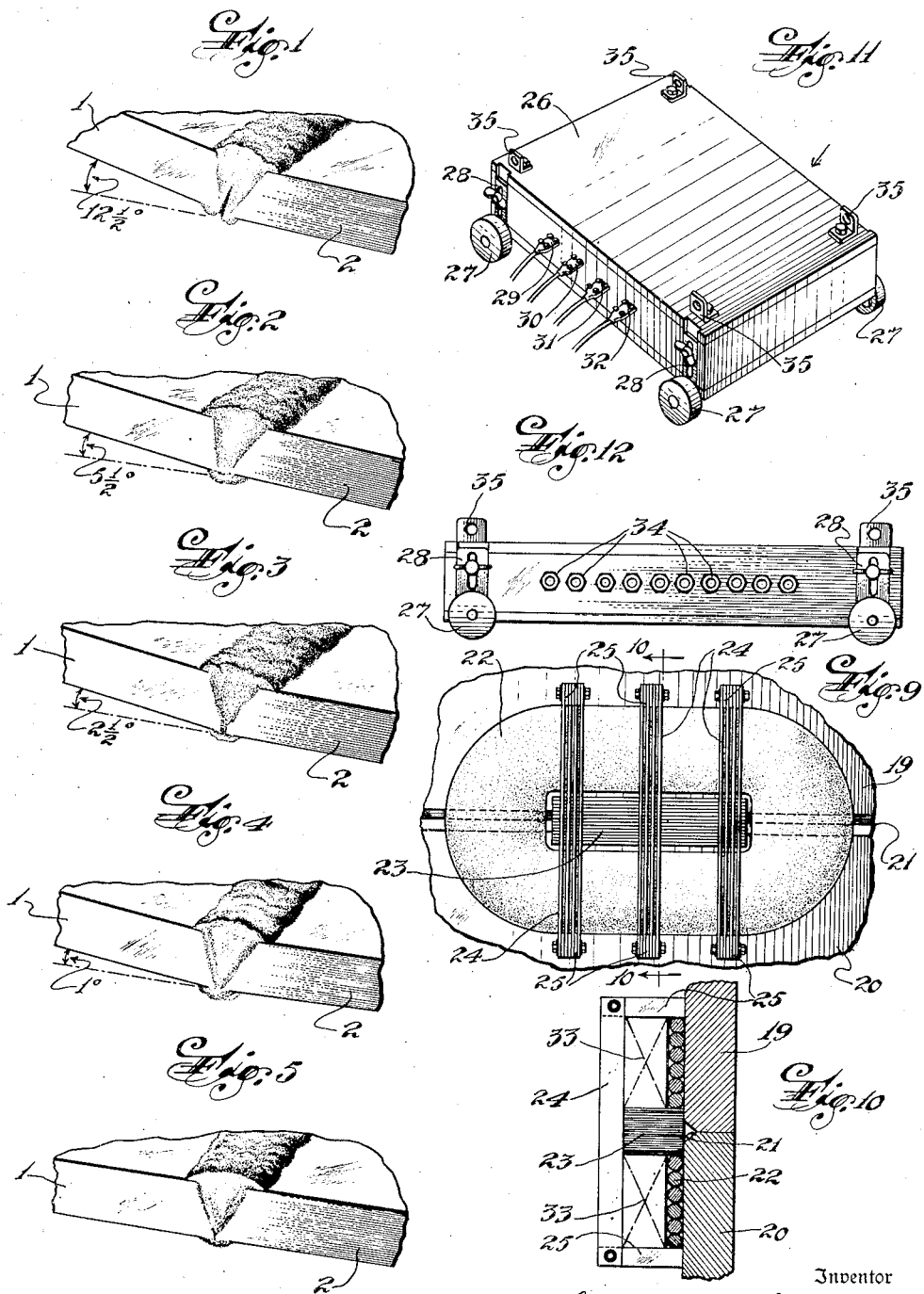

2,365,958

UNITED STATES PATENT OFFICE 2,365,958

CONTINUOUS ARC WELDING SYSTEM

Claude J. Holslag, South Orange, N. J., assignor to Electric Arc, Inc., Newark, N. J.

Application July 10, 1943, Serial No. 494,140

8 Claims. (Cl. 219—8)

This invention relates to a continuous arc welding system wherein the work or pieces to be welded are continuously moving and the welding electrode and associated apparatus is stationary, or vice-versa, and wherein the current used is much greater than in normal manual welding, and the arc is covered by a thick blanket of flux which is usually applied and removed as the welding progresses.

In such welding systems it is the usual practice to try to complete the weld in a single pass by using an electrode of relatively large diameter as compared to normal manual welding, and a heavy current whereby a great amount of metal may be laid down in a single pass. In such an arc welding system the supply voltage is usually on the order of 80 volts or somewhat more, of which approximately 40 volts are used in the arc and the balance in a reactor connected in series with the arc. Hence, the energy consumed in the reactor is waste.

Under the conditions mentioned above, there are quite apt to be excessive strains applied to the area in and around the weld, and it is therefore the principal object of my invention to provide means for eliminating these stresses.

While eliminating the stresses, it is another object of my invention to improve the operating efficiency of the entire system by utilizing the power, which has heretofore been wasted in the usual type of reactor, as a preheater for conditioning the metal to be welded so as to prevent strains which are set up during the welding operation.

The attainment of these objects will be best understood by reference to the annexed drawings, wherein:

Figures 1 to 5 inclusive illustrate test pieces that I have prepared and tested to demonstrate the correctness of the disclosures which are to follow.

Figure 6 illustrates, diagrammatically, one form in which my improvements may be applied.

Figure 7 shows a further form of application of my invention.

Figure 8 illustrates a still further form.

Figure 9 shows, somewhat diagrammatically, the construction of one of the units utilized in my improved system.

Figure 10 is a view on the line 10—10 of Figure 9.

Figure 11 is a perspective view of a unit used in my improved system.

Figure 12 is a side view in the direction of the arrow of the structure shown in Figure 11.

Referring now to the drawings, in Figures 1 to 5 inclusive, which were made from photographs of original test plates, 1 and 2 are two steel plates 2⅛" thick welded together by a ¼" electrode utilizing, in each case, 360 amperes. In making a weld of the type shown, approximately fifteen passes or beads are required to complete the weld. In Figure 1, the approximate temperature between beads or weld layers was held at 80 degrees F. After the weld was completed, it cracked as indicated in the drawings.

In Figure 2 the temperature between the beads was maintained at 200 degrees F. with the result shown in the drawings.

In Figure 3 the temperature between the beads was held at 300 degrees F. with the result as shown.

In Figure 4 the temperature between the beads was held at 400 degrees F. with the result as indicated.

In Figure 5 the temperature was held at 500 degrees F., showing that at this temperature no apparent strains or stresses were set up and left in the weld or the material adjacent thereto.

These tests, together with others which I have made, clearly indicate that care must be exercised in making welds to avoid stresses in the weld area; especially is this true where large electrodes and heavy currents are used, and where the materials welded are of the alloy type. Consequently, pre- and post-heating must be performed according to the materials to be welded and conditions surrounding the same.

In Figure 6 a tube 3 is to be welded along the seam 4. This welding operation is performed by an electrode 5 fed, in any satisfactory manner, through a nozzle 6 through which an excess quantity of flux 7 is passed from the source of supply by means of the pipe 8 so that the arc is covered or blanketed by a relatively thick layer of flux, the excess, not used up in the welding operation, being picked up by the hood 9 and delivered by a pipe 10 to a receiver. This laydown and pick-up apparatus for the flux may take some other form than that shown which is somewhat as indicated in my Patent 2,105,079, issued January 11, 1938. The current supplied to the electrode 5 by means of any suitable sliding contact 11, is connected through a reactor R to the secondary S' of a transformer T' having a primary P' connected to a suitable source of power.

One end of the secondary S' is electrically connected to the tube 3 by the carriage containing it, or by a sliding contact such as indicated at 12. Another transformer T, having a primary P and secondary S, furnishes current to a preheating structure 13, but is connected to a post-heater 14. If necessary, some form of impedance 15 may be utilized in this heating circuit. The pre- and post-heaters 13 and 14 are preferably constructed in a manner to be hereinafter described, but the main function of the preheater 13 is to bring the metal to be welded up to a suitable temperature so as to eliminate, as far as possible, the strains in the metal around the weld area and any strains, remaining therein after the welding, are removed by the post-heater 14.

In Figure 7 I have entirely eliminated the reactor R and its supply transformer T', and the transformer T furnishes its power directly to the pre- and post-heaters 13 and 14 which serve a dual purpose of heaters and reactors.

In Figure 8 the preheater 13 is in the form of a transformer having a primary 16 and a secondary 17. The secondary 17 is connected to the electrode 5 and also to an auxiliary pre-heater 18 which is preferably utilized to step up the temperature as determined by the preheater 13. In this case the preheater 13 acts as a heater and a reactor. Also, the auxiliary heater 18 has a steadying effect in multiple across the arc, especially so if bridged by a suitable capacity. In the arrangement of Figure 8, the post-heating structure 14 may be used if the type of work requires it. A switch 36 may be included in its circuit.

In Figures 9 and 10 I have shown, somewhat diagrammatically, a heater and reactor unit positioned over two flat plates 19 and 20 which are to be welded together along the seam 21. This unit includes a coil 22 of a few turns of large wire; for example, for many classes of work I have found six turns of 500,000 circular-mil cable to be satisfactory for pre-heating.

Positioned in the central part of the winding is a core 23 of suitable laminated magnetic material such as transformer stock, and extending transversely across the core are a plurality (for the sake of simplicity only three are shown) of cross-bars 24 of similar laminated stock; and extending downwardly from the ends of the bars 24 are legs 25 of similar laminated material. The legs 25 and the central core 23 are all shown in Figure 10 as flush with the lower plane of the coil 22 and in contact with the pieces 19 and 20 that are to be welded together. The nearer the coil 22 is to the pieces, the greater the heating effect, but in practice, where the structure is mounted within a casing 26 of suitable insulating material, such as Transite, the coil 22 may be a slight distance inwardly from the plane of the end of the leg 25, and the central core 23, in order to have some protection from the elements. Relative adjustment may also be provided between the winding 22 and the core members to change the heating and reactive effects.

As shown in Figure 11, the casing 26 is provided with four trucks 27 which are adjustably mounted by the members 28 so as to position the coil 22 to give the desired heating and reactance effect. In addition, the coil 22 may be arranged in two sections, with the terminals brought out at 29, 30, 31 and 32, whereby they may be connected in series or in parallel for current and reactance regulation. In some cases, the structure of Figure 11 may contain a primary winding such as 16 shown in Figure 8 and indicated by the cross-dotted lines 33 in Figure 10. In this case, the primary winding may be divided into two parts which may be connected in series or parallel for utilizing a 440 or 220-volt primary, with taps on each section, these terminals being indicated at 34.

The casing 26 is also provided with lugs 35 for receiving grab-hooks or the equivalent for moving the heater-reactor structure to any desired location. The particular design shown in Figure 11, although forming no part of my present invention, is very useful in its application thereto.

While I have shown the combined pre- and post-heaters and reactors as exteriorly positioned with respect to the parts to be welded, they may be mounted interiorly and of course formed to suit the structure to be welded.

It is obvious that many of the details for carrying my invention into practice may be varied over a considerable range without departing from the spirit of the same; for example, the laminations used in the construction of Figure 9 may be E-shaped, which it may be advisable to use instead of the form shown.

What I claim is:

1. In a continuous arc-welding system in which the arc current is much greater than in normal manual welding and the arc is covered by a thick blanket of flux which is applied to the weld area and removed as the welding progresses, means for eliminating strains in the metal set up by the welding operation, said means including at least one preheating coil structure positioned on the material just in front of the area to be welded, and a post-heating coil structure positioned on the material just back of the welded area, said coil structures being relatively movable along the entire length of the seam to be welded and having adjustments whereby their heating effects may be regulated to suit the welding operations.

2. In a continuous arc-welding system in which the arc current is relatively great and the arc is covered by a thick blanket of flux which is applied and removed as the welding progresses, means for eliminating troublesome strains in the metal set up by the welding operation, said means including at least one preheating coil structure positioned on the metal in front of the area to be welded, said coil structure being relatively movable along the entire length of the seam to be welded and having adjustments whereby its heating effect may be regulated to suit the welding operation.

3. In a continuous arc-welding system in which the arc current is relatively great and the arc is covered by a thick blanket of flux which is applied and removed as the welding progresses, means for eliminating troublesome strains in the metal set up by the welding operation, said means including at least one preheating coil structure positioned on the metal in front of the area to be welded and having relative movement along the entire length of said area, said coil structure being connected into the arc circuit to act as both a preheater and a reactance for controlling the arc.

4. In a continuous arc-welding system in which the arc current is relatively great and the arc is covered by a thick blanket of flux which is applied and removed as the welding progresses, means for eliminating troublesome strains in the metal set up by the welding operation, said means including at least one preheating coil structure positioned on the metal in front of the area to be welded and having relative movement along the entire length of said area, said coil structure being connected into the arc circuit and having adjustments whereby it acts as both a preheater and a regulating reactance for the arc.

5. In a continuous arc welding system in which the arc current is relatively great and the arc is covered by a thick blanket of flux which is applied and removed as the welding progresses, means for eliminating troublesome strains in the metal set up by the welding operation, said means including two preheating coil structures positioned in tandem relationship on the metal in advance of the arc, the coil structure farthest from the arc being connected into the arc circuit to act as a reactance therein as well as a preheater, while the other coil structure nearest the arc acts as a preheat step-up.

6. In an arc-welding system, means for eliminating troublesome strains in the metal set up by the welding operations, said means including at least one preheating coil structure adapted to be positioned on the metal in front of the area to be welded and having relative movement along the entire length of said area, at least a portion of said coil structure being connected into the arc circuit to act as both a preheater and a reactance for controlling the arc.

7. In a continuous arc-welding system in which the arc current is relatively great and the arc is covered by a thick blanket of flux which is applied and removed as the welding progresses, means for eliminating troublesome strains in the metal set up by the welding operation, said means including two preheating coil structures positioned in tandem relationship on the metal in advance of the arc, one of said coil structures acting as a preliminary heater while the coil structure nearest the arc acts as a preheat booster, the arc current being taken off ahead of the heat booster coil structure, a post-heater coil structure positioned directly after the weld, one or more of said coil structures having adjustable parts for varying the heating and reactance effects thereof.

8. In an arc-welding system, means for eliminating troublesome strains in the metal set up by the welding operations, said means including at least two heating coil structures adapted to be placed on the metal being welded in close proximity to the arc area and being relatively movable thereon along the entire length of said area, at least some part of one of said structures adapted to be connected into the arc circuit.

CLAUDE J. HOLSLAG.